US005777030A

United States Patent [19]
Hanes et al.

[11] Patent Number: 5,777,030
[45] Date of Patent: Jul. 7, 1998

[54] BLENDS OF A STYRENIC POLYMER AND MONOVINYLAREN/CONJUGATED DIENE BLOCK COPOLYMERS

[75] Inventors: Mark D. Hanes; William H. Beever; David L. Hartsock, all of Bartlesville, Okla.

[73] Assignee: Phillips Petroleum Company, Bartlesville, Okla.

[21] Appl. No.: 720,406

[22] Filed: Sep. 27, 1996

[51] Int. Cl.$^6$ ............................................. C08L 53/02
[52] U.S. Cl. ........................... 525/93; 525/95; 525/98; 525/310; 525/89
[58] Field of Search ........................ 525/98, 93, 95, 525/310, 89

[56] References Cited

U.S. PATENT DOCUMENTS

| | | | |
|---|---|---|---|
| 4,386,190 | 5/1983 | Bailey | 525/93 |
| 4,397,986 | 8/1983 | Hornbaker | 525/64 |
| 4,584,346 | 4/1986 | Kitchen | 525/98 |
| 5,162,416 | 11/1992 | Udipi | 524/399 |
| 5,180,535 | 1/1993 | Yamaoka et al. | 264/328.16 |

OTHER PUBLICATIONS

Novacor Chemical sales brochure describes styrene/methyl methacrylate copolymers.

ARCO Chemical Company sales brochure describes styrene/metharylate copolymers (Dylark).

*Primary Examiner*—Mark L. Warzel
*Attorney, Agent, or Firm*—Carl D. Corvin

[57] ABSTRACT

A polymer blend composition comprising (A) a monovinylarene/conjugated diene block copolymer, and (B) a styrenic polymer of styrene/methyl methacrylate is provided. A process for preparing the composition and articles prepared from the composition are also provided.

23 Claims, No Drawings

5,777,030

BLENDS OF A STYRENIC POLYMER AND MONOVINYLAREN/CONJUGATED DIENE BLOCK COPOLYMERS

BLENDS OF A STYRENIC POLYMER AND MONOVINYLARENE/CONJUGATED DIENE BLOCK COPOLYMERS

This invention relates to blends comprising monovinylarene/conjugated diene block copolymer and a styrenic polymer of styrene/methyl methacrylate.

BACKGROUND OF THE INVENTION

Monovinylarene/conjugated diene copolymers are known and useful for a variety of purposes. Polymers and polymer blend compositions which can be formed into articles possessing high impact properties of increased toughness, while maintaining good mechanical properties such as desired stiffness, are of particular interest. These articles have numerous uses such as display racks, crisper trays, and components of toys.

The addition of some styrenic polymers to standard melt flow monovinylarene/conjugated diene block copolymers can increase the mechanical properties of the polymer with the exception of the polymer impact properties. Unfortunately, methods known to improve the polymer impact properties also can have a negative effect of lessening other mechanical properties of the polymer.

It is therefore desirable to develop polymer blends having increased impact strength while maintaining good mechanical properties.

OBJECT OF THE INVENTION

It is an object of this invention to provide polymer blend compositions having improved impact properties.

It is another object of this invention to provide polymer blend compositions retaining good mechanical properties and having improved impact properties.

It is a further object of this invention to provide processes for preparing polymer blend compositions having improved impact properties.

It is yet another object of this invention to provide a process for preparing polymer blend compositions having good impact properties as well as retaining good mechanical properties.

In accordance with this invention, a polymer blend composition comprising (A) a monovinylarene/conjugated diene block copolymer present in the polymer blend in an amount in the range of from about 90 weight percent to about 25 weight percent based on the total weight of the polymer blend, wherein the monovinylarene is present in the block copolymer in an amount in the range of from about 95 weight percent to about 71 weight percent based on the weight of the monovinylarene/conjugated diene block copolymer, wherein the conjugated diene is present in the block copolymer in an amount in the range of from about 5 weight percent to about 29 weight percent based on the weight of the monovinylarene/conjugated diene block copolymer, and wherein the monovinylarene/conjugated diene block copolymer has a melt flow rate in the range of from about 10 g/10 min. to about 25 g/10 min., measured according to ASTM D-1238 (1994); and (B) a styrenic copolymer of styrene/methyl methacrylate wherein the styrenic copolymer is present in the polymer blend in an amount in the range of from about 10 weight percent to about 75 weight percent based on the total weight of the polymer blend, wherein the methyl methacrylate is present in the styrenic copolymer in an amount in the range of from about 5 weight percent to about 50 weight percent based on the weight of the styrenic copolymer, and wherein the styrene is present in the styrenic copolymer in an amount in the range of from about 95 weight percent to about 50 weight percent based on the weight of the styrenic copolymer, is provided.

In accordance with another embodiment of this invention, a composition consisting essentially of:

(A) a monovinylarene/conjugated diene block copolymer present in the polymer blend in an amount in the range of from about 90 weight percent to about 25 weight percent based on the total weight of the polymer blend, wherein the monovinylarene is present in the block copolymer in an amount in the range of from about 95 weight percent to about 71 weight percent based on the weight of the monovinylarene/conjugated diene block copolymer, wherein the conjugated diene is present in the block copolymer in an amount in the range of from about 5 weight percent to about 29 weight percent based on the weight of the monovinylarene/conjugated diene block copolymer, and wherein the monovinylarene/conjugated diene block copolymer has a melt flow rate in the range of from about 10 g/10 min. to about 25 g/10 min., measured according to ASTM D-1238 (1994); and (B) a styrenic copolymer of styrene/methyl methacrylate wherein the styrenic copolymer is present in the polymer blend in an amount in the range of from about 10 weight percent to about 75 weight percent based on the total weight of the polymer blend, wherein the methyl methacrylate is present in the styrenic copolymer in an amount in the range of from about 5 weight percent to about 50 weight percent based on the weight of the styrenic copolymer, and wherein the styrene is present in the styrenic copolymer in an amount in the range of from about 95 weight percent to about 50 weight percent based on the weight of the styrenic copolymer, is provided.

In accordance with other embodiments of this invention, processes for preparing polymer blend compositions are provided.

In further accordance with other embodiments of this invention, articles prepared from polymer blend compositions are provided.

DESCRIPTION OF THE INVENTION

The present invention provides polymer blend compositions, processes for preparing polymer blend compositions, and articles of manufacture prepared therefrom. Any means known in the art suitable to produce the component polymers can be employed in the present invention, and many suitable component polymers are commercially available.

The composition of the polymer blends can vary broadly. Generally component (A), the monovinylarene/conjugated diene block copolymer, is present in the polymer blend in an amount in the range of from about 90 weight percent to about 25 weight percent based on the total weight of the polymer blend, preferably from about 85 weight percent to about 50 weight percent, more preferably in an amount of about 80 weight percent.

Component (B), a styrenic copolymer of styrene/methyl methacrylate, is generally present in an amount in the range of from about 10 weight percent to about 75 weight percent based on the total weight of the polymer blend, preferably from about 15 weight percent to about 50 weight percent, more preferably in an amount of about 20 weight percent.

Insufficient amounts of the monovinylarene/conjugated diene block copolymer could result in the polymer blend composition not exhibiting desired toughness; insufficient amounts of the styrenic copolymer could result in the polymer blend composition not exhibiting desired mechanical properties.

Component (A), the monovinylarene/conjugated diene block copolymers, useful in this invention are block copolymers having a melt flow rate in the range of from about 10 g/10 min. to about 25 g/10 min. measured according to ASTM D-1238 (1994), Condition G. Preferably the monovinylarene/conjugated diene block copolymers have a melt flow rate in the range of from about 12 g/10 min. to about 20 g/10 min.; and most preferably, the monovinylarene/conjugated diene block copolymers have a melt flow rate in the range of from 13 g/10 min. to 18 g/10 min. Block copolymers having higher or lower melt flow values can result in polymer blend compositions that do not have increased impact strength while retaining good mechanical properties.

Generally, the monovinylarene is present in the block copolymer in an amount in the range of from about 95 weight percent to about 71 weight percent based on the weight of the monovinylarene/conjugated diene block copolymer; preferably the monovinylarene will be present in the block copolymer in the range of from about 85 weight percent to about 73 weight percent based on the weight of the monovinylarene/conjugated diene block copolymer; and more preferably the monovinylarene is present in an amount of 75 weight percent.

The conjugated diene is generally present in the block copolymer in an amount in the range of from about 5 weight percent to about 29 weight percent based on the weight of the monovinylarene/conjugated block copolymer; preferably the conjugated diene is present in the block copolymer in an amount in the range of from about 15 weight percent to about 27 weight percent based on the weight of the monovinylarene/conjugated block copolymer; and more preferably the conjugated diene is present in an amount of about 25 weight percent.

Suitable conjugated dienes which can be used in the block copolymers include those having 4 to 12 carbon atoms per molecule, with those having 4 to 8 carbon atoms preferred. Examples of such suitable compounds include but are not limited to, 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof The preferred dienes are 1,3-butadiene and isoprene, most preferred is 1,3-butadiene, as they are most readily available.

Suitable monovinylarene compounds which can be used in the copolymers include those having 8 to 18 carbon atoms per molecule, preferably 8 to 12 carbon atoms. Examples of such suitable compounds include, but are not limited to styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and mixtures thereof. Styrene is the preferred monovinylarene compound due to ease of polymerization.

When the above relative amounts of monovinylarene and conjugated diene are present in the monovinylarene/conjugated diene block copolymer, the resultant polymer blend composition exhibits improved impact properties and retains good mechanical properties.

The monovinylarene/conjugated diene block copolymers generally can be prepared by a solution process involving sequential polymerization of a monovinylarene monomer and a conjugated diene monomer. In some circumstances, if desired, the polymer chains can be coupled to form multimodal block copolymers having a broad molecular weight distribution.

The basic starting materials and polymerization conditions for preparing monovinylarene/conjugated diene block copolymer are disclosed in U.S. Pat. No. 4,584,346; the disclosure of which is hereby incorporated by reference.

In a preparation method typical of this publication, a conjugated diene monomer and a monovinylarene monomer are copolymerized sequentially in the presence of an initiator. The initiators can be any organomonoalkali metal compound known for such purposes. Preferably to achieve the best block copolymer product properties, the initiator is provided in three separate charges. The following copolymeric species are considered to be formed prior to coupling in accordance with three possible sequences of addition of monomers and initiator:

Sequence 1 S-B-S-B-S-B-Li S-B-S-B-Li S-B-Li
Sequence 2 S-S-B-S-B-Li S-B-S-B-Li S-B-Li
Sequence 3 S-B-S-B-S-B-Li S-B-Li
wherein
S=monovinylarene block
B=conjugated diene block
Li=residue from a monoalkali metal initiator.

The polymerization process can be carried out in a hydrocarbon diluent at any suitable temperature, preferably in the range of from about −100° C. to about 150° C., and at pressures sufficient to maintain the reaction mixture substantially in the liquid phase. Small amounts of polar organic compounds, such as for example, ethers, thioethers, and tertiary amines can be employed in a hydrocarbon diluent to improve the effectiveness of the initiator and/or to randomize at least a portion of the monovinylarene monomer in a mixed monomer charge. Each monomer charge or monomer mixture charge preferably is polymerized under solution polymerization conditions such that the polymerization of each monomer charge or monomer mixture charge is substantially complete before charging a subsequent component.

After polymerization is complete, a coupling agent must be added. Exemplary coupling agents include but are not limited to di- or multivinylaromatic compounds, di- or multiepoxides, di- or multiisocyanates, di- or multialdehydes, di- or multiketones, di- or multihalides, di- or multiesters, and the like. Particularly preferred is epoxidized soybean oil.

While not intending to be bound by theory, it is believed that some active polymer chains become terminated rather than reacting with the required coupling agent. It is believed that terminated chains can comprise, at times, up to 30% or more of all active chains present. This termination can result in a complex product mixture.

The styrenic copolymer of styrene/methyl methacrylate generally can have a melt flow rate in the range of from about 0.2 g/10 min. to about 100 g/10 min. measured according to ASTM D-1238 (1994), condition G. If the application of the final blend compositions require a high degree of clarity, then preferably a styrenic copolymer will be selected such that the difference in refractive index between the blend components is <0.005; more preferably <0.003, and most preferably such that no measurable difference in refractive index is present, measured according to ASTM D 542.

The composition of the styrenic copolymer of styrene/methyl methacrylate copolymer can vary broadly. Generally the methyl methacrylate is present in the styrenic copolymer in an amount in the range of from about 5 weight percent to about 50 weight percent based on the weight of the styrenic copolymer of styrene/methyl methacrylate. Preferably the methyl methacrylate is present in an amount in the range of from about 15 weight percent to about 35 weight percent based on the weight of the styrenic copolymer; and most preferably the methyl methacrylate is present in an amount in the range of from 20 weight percent to 22 weight percent. Methyl methacrylate is needed in amounts sufficient to render blend compositions with desired toughness; however, too much methyl methacrylate could result in blend compositions with low clarity.

Generally, the styrene is present in the styrenic copolymer in an amount in the range of from about 95 weight percent to about 50 weight percent based on the weight of the styrenic copolymer of styrene/methyl methacrylate. Preferably the styrene is present in an amount in the range of from about 85 weight percent to about 65 weight percent based on the weight of the styrenic copolymer; and most preferably the styrene is present in an amount in the range of from 80 weight percent to 78 weight percent, for reasons given above.

The styrenic copolymer of styrene/methyl methacrylate generally can be prepared in accordance with any method known in the art. Typically the styrenic copolymers are prepared by copolymerization of styrene and methylmethacrylic acid monomers employing a free radical initiator such as peroxy or azo compounds.

Any method known in the art is suitable for blending of components (A) and (B). Preferably the block copolymers and styrenic copolymers are melt blended employing any desired means such as a Banbury mixer, a hot roll, an extruder, or an injection molder. More preferably the polymers are melt blended employing extruder blending techniques for efficiency. Single or twin screw extruders can be utilized. If desired, the two copolymer blend components can be dry blended prior to the melt blending; any method of dry blending known to those of skill in the art can be employed such as, for example, utilization of a drum tumbler.

Blending conditions of the copolymer components depend upon the blending technique and copolymers employed. If an initial dry blending of the copolymer components is employed, the blending conditions can be at temperatures from room temperature up to just under the lower melt processing temperature of either copolymer component, and blending times can be in the range of a few seconds to hours.

During melt blending, the temperature at which the two copolymer components are combined in the blender generally can be in the range between the higher melt processing point of either copolymer employed and up to just below the lower decomposition temperature of either copolymer.

The time required for the melt blending can vary broadly and depends on the method of blending employed. The time required can be any time sufficient to thoroughly mix the components, without causing unacceptable degradation. Generally, the copolymers are melt blended for a time of about 5 seconds to about 15 minutes, for thorough mixing of the two copolymer components with the least amount of copolymer degradation.

The copolymer blend components can contain additives such as, for example, stabilizers, anti-oxidants, anti-blocking agents, mold release agents, dyes, pigments, and flame retardants, as well as fillers and reinforcing agents, such as, for example glass fibers, as long as the amounts and types do not interfere with the objectives of this invention.

Copolymer blend compositions prepared according to the invention are useful for the production of articles prepared, for example, by milling, extrusion or injection molding.

The polymer blend compositions described above exhibit a combination of desirable characteristics. The polymer blend compositions will exhibit a notched Izod impact strength of greater than 0.41 ft-lbs/inch, and an unnotched Izod impact strength of greater than 3.1 ft-lbs/inch, measured according to ASTM D-256 (1993). The values of both notched and unnotched Izod impact strength for the inventive polymer blend are consistently greater than those values for corresponding blends with monovinylarene/conjugated diene block copolymers and styrenic copolymers wherein the monovinylarene/conjugated diene block copolymers utilized do not exhibit the preferred flowrate and/or the blend composition has less than 25 weight percent of the monovinylarene/conjugated diene block copolymer based on the total weight of the blend.

The polymer blend compositions exhibit haze of less than about 10 percent, preferably less than about 5 percent, measured with a Gardner Hazemeter according to ASTM D-1003 (1992), using test specimens of 50 mil thickness. The polymer blend compositions exhibit Shore D Hardness of greater than about 65 measured according to ASTM D-2240 (1991). Generally the Flexural Modulus of the polymer blends, measured according to ASTM D-790 (1992), is greater than about 220 kilopounds per square inch (ksi).

Polymer blend compositions of this invention will preferably contain an amount of conjugated diene in the range of from about 1 weight percent to about 26 weight percent based on the total weight of the polymer blend composition; more preferably contains an amount from about 7.5 to about 23; and most preferably about 20 weight percent. Higher or lower amounts of conjugated diene present can render copolymer blend compositions which do not have improved impact properties while maintaining good mechanical properties as described above.

The weight percentage of the conjugated diene in the polymer blend composition can be calculated according to the following formula:

$$\frac{\text{weight \% monovinylarene/conjugated diene in blend}}{100} \times$$

weight % conjugated diene in monovinylarene/conjugated diene

EXAMPLE

The following example is presented to further illustrate the invention and is not meant to limit the scope thereby.

The monovinylarene/conjugated diene block copolymer was a pelletized styrene/butadiene block copolymer (SB).

The SB was combined with pelletized styrene/methyl methacrylate copolymer (SMMA) in a process in which the two components were dry blended on a drum tumbler. The resulting pellet mixture was processed into test specimens on a Cincinnati Milacron injection molder.

The styrene/butadiene block copolymer employed was designated as BK-10 (1996), and is available from Phillips Petroleum Company, Bartlesville, Okla. (U.S.A.). The BK-10 block copolymer was prepared employing a sequential solution polymerization and three initiator charges in accordance with U.S. Pat. No. 4,584,346. Polymerization continued essentially to completion after each monomer and initiator charge.

The styrene/butadiene block copolymers had 75 weight percent styrene and 25 weight percent butadiene based on the total weight of the block copolymer, and exhibited a melt flow rate of 16.5 g/10 min. measured according to ASTM D-1238 (1994), condition G. The styrene/butadiene block copolymers exhibited a notched Izod impact strength of a no break (N/B) during the ASTM D-256 (1993).

The styrene/methyl methacrylate copolymer (SMMA) employed was NAS 21®, available from NOVA Corporation, Alberta, Canada. The SMMA copolymer exhibited a notched Izod impact strength of 0.35 ft·lb/in and a refractive index of 1.57 measured according to ASTM D-542.

The runs and results are summarized in Table I wherein:
Haze in percent was measured according to ASTM D-1003 (1992);
Hardness (Shore D) was measured according to ASTM D-2240 (1991);
Flexural Modulus in ksi was measured according to ASTM D-790 (1992);
Notched and Unnotched Izod Impact Strength in ft·lb/in were measured according to ASTM D-256 (1993);
Melt Flow Rate was measured according to ASTM D-1238 (1994);
BK-10 represents the styrene/butadiene block copolymers of the present invention;
KR03® represents a styrene/butadiene copolymer having a melt flow and other characteristics falling outside of the preferred ranges of this invention;
NAS-21 represents the styrene/methyl methacrylate (SMMA) blend component.

Table I demonstrates that the inventive blends have a unique and desirable combination of properties which include but are not limited to, high Izod impact strength (notched and unnotched) coupled with good tensile strength, high flow rate and high styrene content.

A comparison of Samples I and B, for example, shows a clearly superior notched Izod impact strength for the inventive blend (2.7 ft·lb/in) compared with that of the KR03 blend (0.69 ft·lb/in). Examining the notched Izod impact strengths of inventive Sample J (0.80 ft·lb/in) and KR03 Sample C (0.45 ft·lb/in) produces a similar conclusion, although the difference is not so large as in the case for Samples I and B. If we examine the unnotched Izod impact strengths of Samples J and C, we see "No Break" for the inventive Sample J and a much inferior value of 6.0 ft·lb/in for the KR03 Sample C.

TABLE I

| Sample | A | B | C | D | E | F | G | H | I | J | K | L | M |
|---|---|---|---|---|---|---|---|---|---|---|---|---|---|
| KR03 (wt. %) | 100 | 80 | 60 | 50 | 40 | 20 | | | | | | | |
| BK10 (wt. %) | | | | | | | | 100 | 80 | 60 | 50 | 40 | 20 |
| NAS-21 (wt. %) | | 20 | 40 | 50 | 60 | 80 | 100 | | 20 | 40 | 50 | 60 | 80 |
| Tensile Yield (ksi) | 3600 | 3950 | 5000 | 5300 | 6500 | 7350 | 9500 | 3300 | 3400 | 4300 | 5000 | 7250 | 8900 |
| Tensile Break (ksi) | 2550 | 2800 | 3500 | 3400 | * | * | * | 2150 | 2700 | 3300 | 3900 | * | * |
| Elongation Yield (%) | 1.8 | 1.8 | 2.7 | 2.7 | 3.2 | 2.6 | 2.8 | 1.7 | 1.7 | 3.8 | 3.7 | 2.9 | 3.1 |
| Elongation Break (%) | 217 | 132 | 38 | 35 | * | * | * | 217 | 139 | 48 | 28 | * | * |
| Flex. Mod. (ksi) | 240 | 288 | 333 | 350 | 403 | 479 | 518 | 229 | 264 | 329 | 346 | 419 | 477 |
| Flex. Strength (ksi) | 5500 | 6950 | 8600 | 9400 | 11700 | 15050 | 16500 | 4850 | 6100 | 8000 | 8650 | 12050 | 14750 |
| Not. Izod (ft-lbs/in) | N/B | 0.69 | 0.45 | 0.39 | 0.34 | 0.43 | 0.35 | N/B | 2.78 | 0.80 | 0.52 | 0.43 | 0.41 |
| Unn Izod (ft-lbs/in) | N/B | N/B | 6.0 | 3.8 | 3.1 | 2.8 | 2.3 | N/B | N/B | N/B | 9.7 | 3.2 | 2.5 |
| Gard Imp. (cm-kg) | N/B | N/B | 5.0 | 1.2 | 2.1 | 2.1 | 2.5 | N/B | N/B | 3.5 | 3.0 | 2.6 | 3.1 |
| Haze (%) | 5.73 | 3.16 | 2.45 | 2.13 | 1.83 | 1.45 | 1.09 | 7.41 | 4.11 | 3.40 | 3.36 | 2.30 | 1.62 |
| Light Trans (%) | 90.14 | 90.22 | 90.29 | 90.25 | 90.45 | 90.87 | 91.03 | 89.48 | 89.18 | 89.33 | 89.28 | 89.80 | 90.43 |
| Yellowness Index | 7.6 | 7.2 | 6.9 | 6.6 | 5.8 | 3.3 | 1.7 | 8.2 | 8.2 | 7.6 | 7.3 | 5.8 | 4.2 |
| Color Hunter (−b) | −4.9 | −5.0 | −4.7 | −4.9 | −4.4 | −2.8 | −0.7 | −6.1 | −6.5 | −6.7 | −6.8 | −5.6 | −3.8 |
| Vicat Temp. (°F.) | 181 | 194 | 201 | 203 | 205 | 210 | 210 | 172 | 183 | 198 | 199 | 205 | 208 |
| HDT (°F., 264 psi) | 144 | 151 | 156 | 160 | 169 | 169 | 176 | 145 | 142 | 154 | 160 | 162 | 174 |
| Hardness (Shore D) | 67 | 73 | 77 | 77 | 82 | 86 | 87 | 66 | 72 | 77 | 78 | 82 | 84 |
| Melt Flow Rate (Con. G | 7.0 | 6.2 | 5.0 | 4.4 | 4.3 | 3.9 | 2.9 | 16.5 | 13.7 | 11.8 | 9.5 | 8.4 | 6.0 |
| Capillary Rheom. | 1869 | 2000 | 1006 | 1092 | 1139 | 1216 | 1340 | 734 | 735 | 848 | 880 | 956 | 1129 |
| Spiral Flow (in.) | 6.63 | 5.95 | 6.48 | 5.95 | 5.60 | 5.28 | 4.83 | 7.70 | 6.78 | 6.38 | 6.08 | 6.40 | 5.83 |
| Density | 1.01 | 1.02 | 1.04 | 1.04 | 1.05 | 1.07 | 1.08 | 1.01 | 1.02 | 1.04 | 1.05 | 1.06 | 1.07 |

That which is claimed:

1. A polymer blend composition comprising
(A) a monovinylarene/conjugated diene block copolymer present in the polymer blend in an amount in the range of from about 90 weight percent to about 25 weight percent based on the total weight of the polymer blend,
wherein the monovinylarene is present in the block copolymer in an amount in the range of from about 95 weight percent to about 71 weight percent based on the weight of the monovinylarene/conjugated diene block copolymer,
wherein the conjugated diene is present in the block copolymer in an amount in the range of from about 5 weight percent to about 29 weight percent based on the weight of the monovinylarene/conjugated diene block copolymer, and
wherein the monovinylarene/conjugated diene block copolymer has a melt flow rate in the range of from about 12 g/10 min. to about 25 g/10 min., measured according to ASTM D-1238 (1994) condition G; and (B) a styrenic copolymer of styrene/methyl methacrylate wherein the styrenic copolymer is present in the polymer blend in an amount in the range of from about 10 weight percent to about 75 weight percent based on the total weight of the polymer blend, wherein the methyl methacrylate is present in the styrenic copolymer in an amount in the range of from about 5 weight percent to about 50 weight percent based on the weight of the styrenic copolymer, and wherein the styrene is present in the styrenic copolymer in an amount in the range of from about 95 weight percent to about 50 weight percent based on the weight of the styrenic copolymer.

2. A polymer blend composition according to claim 1 wherein the monovinylarene/conjugated diene block copolymer is present in the polymer blend in an amount in the range of from about 85 weight percent to about 50 weight percent based on the total weight of the polymer blend; and wherein the styrenic copolymer is present in the polymer blend in an amount of from about 15 weight percent to about 50 weight percent based on the total weight of the polymer blend.

3. A polymer blend composition according to claim 1 wherein the monovinylarene/conjugated diene block copolymer is present in the polymer blend in an amount of about 80 weight percent based on the total weight of the polymer blend; and wherein the styrenic copolymer is present in the polymer blend in an amount of about 20 weight percent based on the total weight of the polymer blend.

4. A polymer blend composition according to claim 1 wherein the monovinylarene is present in the block copolymer in an amount in the range of from about 85 weight percent to about 73 weight percent based on the weight of the monovinylarene/conjugated diene block copolymer, and wherein the conjugated diene is present in the block copolymer in an amount in the range of from about 15 weight percent to about 27 weight percent based on the weight of the monovinylarene/conjugated diene block copolymer.

5. A polymer blend composition according to claim 1 wherein the monovinylarene is present in the block copolymer in an amount of about 75 weight percent based on the weight of the monovinylarene/conjugated diene block copolymer, and wherein the conjugated diene is present in the block copolymer in an amount of about 25 weight percent based on the weight of the monovinylarene/conjugated diene block copolymer.

6. A polymer blend composition according to claim 1 wherein the monovinylarene/conjugated diene block copolymer has a melt flow rate in the range of from 12 g/10 min. to about 20 g/10 min., measured according to ASTM-D1238 (1994), condition G.

7. A polymer blend composition according to claim 1 wherein the monovinylarene/conjugated diene block copolymer has a melt flow rate in the range of from 13 g/10 min. to 18 g/10 min., measured according to ASTM D-1238 (1994).

8. A polymer blend composition according to claim 1 wherein the monovinylarene in the monovinylarene/conjugated diene block copolymer is styrene.

9. A polymer blend composition according to claim 1 wherein the conjugated diene in the monovinylarene/conjugated diene block copolymer is butadiene.

10. A polymer blend composition according to claim 1 wherein the methyl methacrylate is present in the styrenic copolymer in an amount in the range of from about 15 weight percent to about 35 weight percent based on the weight of the styrenic copolymer, and wherein the styrene is present in the styrenic copolymer in an amount in the range of from about 85 weight percent to about 65 weight percent based on the weight of the styrenic copolymer.

11. A polymer blend composition according to claim 1 wherein the methyl methacrylate is present in the styrenic copolymer in an amount in the range of from 20 weight percent to 22 weight percent based on the weight of the styrenic copolymer, and wherein the styrene is present in the styrenic copolymer in an amount in the range of from 80 weight percent to 78 weight percent based on the weight of the styrenic copolymer.

12. A polymer blend composition according to claim 1 which has notched Izod impact strength of greater than about 0.41 ft.-lbs/inch measured according to ASTM D-256 (1993).

13. A polymer blend composition according to claim 1 which has unnotched Izod impact strength of greater than 3.1 ft-lbs/inch measured according to ASTM D-256 (1993).

14. A polymer blend composition according to claim 1 which has a haze of less than about 10 percent measured with a Gardner Hazemeter according to ASTM D-1003 (1992), using test specimens of 50 mil thickness.

15. A polymer blend composition according to claim 14 which has a haze value of less than about 5 percent.

16. A polymer blend composition according to claim 1 which exhibits Shore D Hardness of greater than about 65 measured according to ASTM D-2240 (1991).

17. A polymer blend composition according to claim 1 which exhibits Flexural Modulus of greater than about 220 kilopounds per square inch measured according to ASTM D-790 (1992).

18. An article made from the composition of claim 1.

19. A polymer blend composition comprising:

(A) a monovinylarene/conjugated diene block copolymer present in the polymer blend in an amount of about 80 weight percent based on the total weight of the polymer blend, wherein the monovinylarene is present in the block copolymer in an amount of about 75 weight percent based on the weight of the monovinylarene/conjugated diene block copolymer and wherein the conjugated diene is present in the block copolymer in an amount of about 25 weight percent based on the weight of the monovinylarene/conjugated diene block copolymer, and where said monovinylarene/conjugated diene block copolymer has a melt flow rate from 13 g/10 min to 18 g/10 min as measured in accordance to ASTM D-1238 (1994); and (B) a styrenic copolymer of styrene/methyl methacrylate, wherein the styrenic copolymer is present in the polymer blend in an amount of about 20 weight percent based on the total weight of the polymer blend, wherein the methyl methacrylate is present in the styrenic copolymer in an amount in the range of from 20 weight percent to 22 weight percent based on the weight of the styrenic copolymer and wherein the styrene is present in the styrenic copolymer in an amount in the range of from 80 weight percent to 78 weight percent based on the weight of the styrenic copolymer.

20. A polymer blend composition consisting essentially of:

(A) a monovinylarene/conjugated diene block copolymer present in the polymer blend in an amount in the range of from about 90 weight percent to about 25 weight percent based on the total weight of the polymer blend, wherein the monovinylarene is present in the block copolymer in an amount in the range of from about 95 weight percent to about 71 weight percent based on the weight of the monovinylarene/conjugated diene block copolymer, wherein the conjugated diene is present in the block copolymer in an amount in the range of from about 5 weight percent to about 29 weight percent based on the weight of the monovinylarene/conjugated diene block copolymer, and wherein the monovinylarene/conjugated diene block copolymer has a melt flow rate in the range of from 12 g/10 min. to about 25 g/10 min., measured according to ASTM D-1238 (1994); and (B) a styrenic copolymer of styrene/methyl methacrylate copolymer, wherein the styrenic copolymer is present in the polymer blend in an amount in the range of from about 10 weight percent to about 75 weight percent based on the total weight of the polymer blend, wherein the methyl methacrylate is present in the styrenic copolymer in an amount in the range of from about 5 weight percent to about 50 weight percent based on the weight of the styrenic copolymer, and wherein the styrene is present in the styrenic copolymer in an amount in the range of from about 95 weight percent to about 50 weight percent based on the weight of the styrenic copolymer.

21. An article made from the composition of claim 19.

22. An article made from the composition of claim 20.

23. A process for preparing a polymer blend comprising melt blending:

(A) a monovinylarene/conjugated diene block copolymer present in the polymer blend in an amount in the range of from about 90 weight percent to about 25 weight percent based on the total weight of the polymer blend, wherein the monovinylarene is present in the block copolymer in an amount in the range of from about 95 weight percent to about 71 weight percent based on the weight of the monovinylarene/conjugated diene block copolymer, and wherein the conjugated diene is present in the block copolymer in an amount in the range of from about 5 weight percent to about 29 weight percent based on the weight of the monovinylarene/conjugated diene block copolymer, and wherein the monovinylarene/conjugated diene block copolymer has a melt flow rate in the range of from 12 g/10 min. to about 25 g/10 min., measured according to ASTM D-1238 (1994); and (B) a styrenic copolymer of styrene/methyl methacrylate wherein the styrenic copolymer is present in the polymer blend in an amount in the range of from about 10 weight percent to about 75 weight percent based on the total weight of the polymer blend, wherein the methyl methacrylate is present in the styrenic copolymer in an amount in the range of from about 5 weight percent to about 50 weight percent based on the weight of the styrenic copolymer, and wherein the styrene is present in the styrenic copolymer in an amount in the range of from about 95 weight percent to about 50 weight percent.

* * * * *